United States Patent
Morris

(10) Patent No.: US 8,468,742 B2
(45) Date of Patent: Jun. 25, 2013

(54) PLANTER

(76) Inventor: Patrick John Morris, Matakana (NZ)

( * ) Notice: Subject to any disclaimer, the term of this patent is extended or adjusted under 35 U.S.C. 154(b) by 0 days.

(21) Appl. No.: 12/600,654

(22) PCT Filed: May 16, 2008

(86) PCT No.: PCT/NZ2008/000108
§ 371 (c)(1),
(2), (4) Date: Apr. 22, 2010

(87) PCT Pub. No.: WO2008/143525
PCT Pub. Date: Nov. 27, 2008

(65) Prior Publication Data
US 2010/0205861 A1    Aug. 19, 2010

(30) Foreign Application Priority Data
May 18, 2007    (NZ) ........................... 555306

(51) Int. Cl.
*A01G 9/02*    (2006.01)
*A47G 7/02*    (2006.01)

(52) U.S. Cl.
USPC .............................................. 47/67; 47/65.5

(58) Field of Classification Search
USPC .................. 47/65.5, 65, 62 R, 63, 59 R, 67,
47/65.8, 66.7, 65.7, 66.1, 66.6, 80, 29.5,
47/20.1, 30
See application file for complete search history.

(56) References Cited

U.S. PATENT DOCUMENTS

| | | | | |
|---|---|---|---|---|
| 82,052 | A * | 9/1868 | Whitman | 47/80 |
| 126,112 | A * | 4/1872 | Von Levetzoe | 47/80 |
| 627,231 | A * | 6/1899 | Hinrichs | 47/80 |
| 918,563 | A * | 4/1909 | Lewis | 47/80 |
| 4,324,070 | A * | 4/1982 | Swisher | 47/81 |
| 6,298,600 | B1 * | 10/2001 | Feldman | 47/67 |
| 6,874,278 | B2 | 4/2005 | Felknor et al. | |
| 2005/0108938 | A1 * | 5/2005 | Bakula et al. | 47/64 |

FOREIGN PATENT DOCUMENTS

| | | |
|---|---|---|
| JP | 54149951 U | 10/1979 |
| JP | 58141325 U | 9/1983 |
| JP | 59147455 U | 10/1984 |

* cited by examiner

Primary Examiner — Monica Williams
(74) Attorney, Agent, or Firm — Bio Intellectual Property Services LLC (Bio IPS); O. Sam Zaghmout

(57) ABSTRACT

A planter having a body (1) suitable for receiving a volume of plant growth medium and the root structure of a plant (2), the planter having a lower opening (4), a retainer (6) which can removably engage the lower opening to reduce the effective size of the lower opening, and a reservoir (9) suitable for holding a body of fluid (10) such that the fluid can gradually move from the reservoir into the planter's body to water and/or nourish a plant when planted within the planter, the planter being formed such that when it is in use it can be secured in an elevated disposition with the root structure of a plant contained within the body and a stem and/or foliage of the plant passing through the lower opening (4) and through the retainer (6) such that the plant is oriented in a downwards disposition.

17 Claims, 3 Drawing Sheets

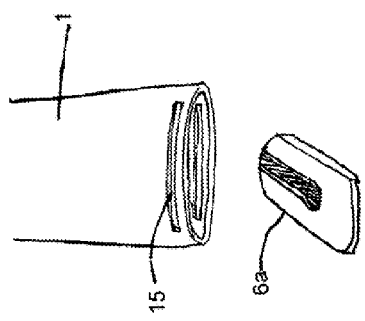
Figure 6
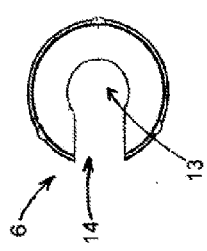
Figure 3
Figure 4
Figure 5

PLANTER

FIELD OF INVENTION

This invention relates to a planter. A preferred form of the invention relates to a planter which can support a growing plant in an inverted or 'upside down' disposition.

BACKGROUND

Planters which support a pot plant in an inverted disposition are known. Australian patent specification No. 701706 to Souris describes a plant pot for supporting a plant in an inverted orientation and includes an opening of fixed size for placing the plant in the pot. However Souris suffers from the disadvantage that there is no facility for accommodating plants with root structures too large to pass through the opening. It is an object of at least one form of the present invention to go at least some way towards addressing this disadvantage, or to at least provide the public with a useful choice.

The term "comprising" or derivatives thereof (eg "comprises"), if and when used herein, should be interpreted non-exclusively—eg if used in relation to a specific combination of features the term should not be taken to exclude the possibility of additional unspecified features.

Orientational terms such as "upper" and lower as used herein should be interpreted as applicable to the normal in use disposition of the invention.

SUMMARY OF THE INVENTION

According to one aspect of the invention there is provided a planter having a body suitable for receiving a volume of plant growth medium (eg potting mix or soil) and the root structure of a plant, the planter having a lower opening, retainer means which can removably engage the lower opening to significantly reduce the effective size of the lower opening, and a reservoir suitable for holding a body of fluid such that the fluid can gradually move from the reservoir into the planter's body to water and/or nourish a plant when planted within the planter, the planter being formed such that when it is in use it can be secured in an elevated disposition with the root structure of a plant contained within the body and a stem and/or foliage of the plant passing through the lower opening and through the retainer means such that the plant is oriented in a downwards disposition.

Optionally the retainer means has a central aperture and a side opening, the side opening proceeding from an edge of the retainer means to merge with the central aperture, the retainer means formed such that it can be moved against the side of the stem of a plant so that the stem passes through the side opening and into the central aperture.

Optionally the side opening of the retainer means is substantially narrower than the central opening of the retainer means.

Optionally the retainer means is generally in the form of an annular disc, except for the side opening.

Optionally the retainer means is concave.

Optionally the retainer means has a plurality of locking tabs which can be received in complimentary recesses around the planter's lower opening.

Optionally the planter has a slot open to the exterior of the planter and the retainer means can be slid through the slot to significantly reduce the effective size of the lower opening.

Optionally the reservoir is removable from the rest of the planter.

Optionally the reservoir has a fluid permeable wall and/or floor through which water in the reservoir can pass.

Optionally the fluid permeable wall and/or floor is formed from a ceramic substance.

Preferably the planter has an upper opening for receiving the reservoir.

Optionally the upper opening can receive a plant and a volume of plant growth medium (eg potting mix or soil) prior to receiving the reservoir.

Preferably the planter incorporates hanging means to facilitate hanging the planter in an elevated disposition.

Optionally the hanging means incorporates a length or cord or chain.

According to a further aspect of the invention there is provided a planter as described above, with a plant and plant growth medium within the body, with water (pure or otherwise) contained in the reservoir, and a stem of the plant proceeding downwards through the lower opening such that the plant is substantially inverted.

According to another aspect of the invention there is provided a method of placing a plant in a planter as described above, the method comprising the steps of:
a) arranging a plant so that a root system of the plant is within the body of the planter with the retainer means extending around a stem of the plant;
b) locking the retainer means with respect to the body of the planter; and
c) causing the planter to be in an elevated situation such that the plant is held by the planter in a substantially inverted disposition.

Preferably the retainer means is associated with the stem by moving the stem through a side opening in the retainer means so that the stem extends through a central part of the retainer means, the side opening being such that it provides a channel which is open to an outer edge of the retainer means.

DESCRIPTION OF THE DRAWINGS

Some preferred forms of the invention will now be described by way of example and with reference to the accompanying drawings, of which:

FIGS. 3-5 show detail of a retainer forming part of the planter; and

FIG. 6 is an isometric view illustrating a planter according to a further embodiment of the invention.

DETAILED DESCRIPTION

Figure 1:
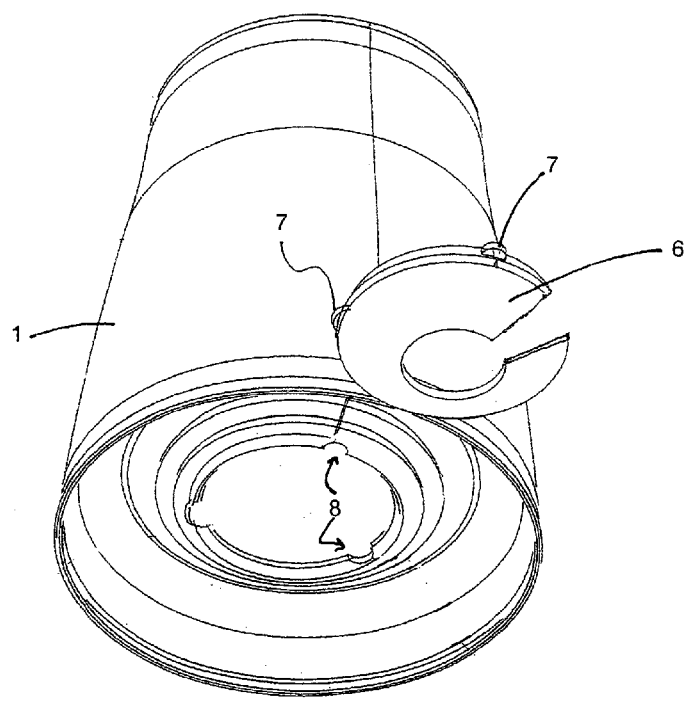
FIG. 1 is an isometric view of a planter for a pot plant.
Figure 2:
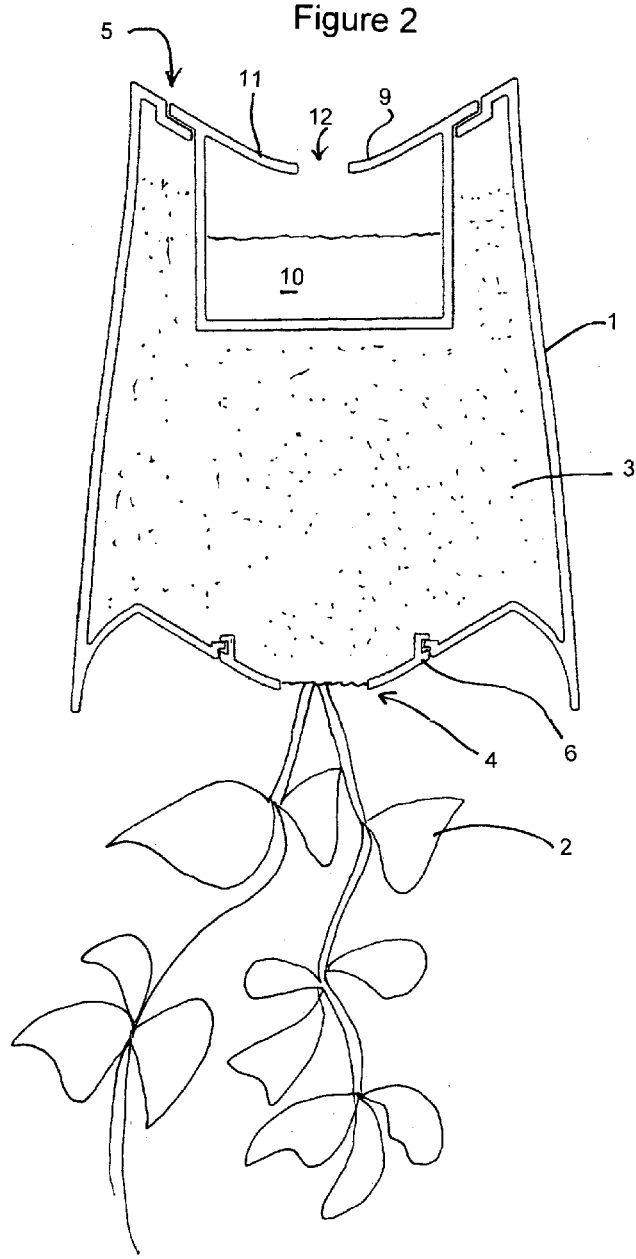
FIG. 2 is longitudinal cross sectional view of the planter.

Referring to FIGS. 1 and 2, the planter comprises a main body 1 for receiving a pot plant 2 and a volume of plant growth medium 3 (eg potting mix and/or soil). The planter has a lower opening 4 and an upper opening 5. A retainer 6 engages the lower opening 4 in a removable fashion to reduce the effective size of that lower opening. To facilitate this the retainer 6 has a series of tabs 7 which engage complimentary recesses 8 around the lower opening 4. When the tabs 7 are moved through the complimentary recesses 8 the retainer can be turned by hand to lock it in place, with the tabs supported by the body of the planter adjacent to the opening 4. The retainer 6 can be removed by turning it in the reverse direction and then moving it away from the lower recess 4. In other embodiments of the invention there may be an alternative mechanism for securing the retainer 6 to the body 1, for example a screw thread or a latch arrangement, etc.

The planter has a water permeable reservoir 9 which can be removably received in and held against the upper opening 5. The reservoir 9 is preferably formed from a suitable porous ceramic material (eg clay) so that water 10 held within it can gradually seep down into the plant growth medium and thus into the root structure of the plant. This transfer of water may be by way of gradual absorption through the reservoir. As shown, the reservoir 9 has a concave upper surface 11 to reduce the chance of spills when water is poured through its filling aperture 12. It will be appreciated that the reservoir 9 is not limited to the delivery of only water, for example it can be used to deliver plant nutrients or the like. While the reservoir 9 is removable from the rest of the planter, in some embodiments of the invention it may be a permanently fixed or integral part of the planter. In other embodiments of the invention the reservoir may be received in and held against an opening in the body 1 over and above the lower and upper openings 4, 5.

The retainer 6 is shown in detail at FIGS. 3, 4 and 5. It is in the form of a slightly concave annular disk with a central aperture 13 and a side opening 14. The side opening 14 proceeds from an outside edge of the retainer to merge with the central aperture 13 in a generally key hole shape.

To pot a plant the planter is first positioned with its lower opening 4 facing upwards and the upper opening 5 facing down. With the retainer 6 removed from the rest of the planter the root system of the plant is lowered into the body 1 through the opening 4 so that the plant's stem and foliage extend upwards outside the body 1. The retainer 6 is then maneuvered around the plant's stem (ie between its root structure and foliage), or more specifically pushed against the stem so that the stem passes through the side opening 14 and into the retainer's central opening 13. The retainer 6 is then locked in place on the body 1 and the planter, and thus the plant, is turned over so that the upper opening 5 is facing upwards. The reservoir 9 is then removed from the upper opening 5 and the planter's body 1 is filled with plant growth medium 3. The reservoir 9 is then set in place in the upper opening and filled with water and/or plant nutrients.

It will be appreciated that transferring a plant in the manner described has advantages in that the lower opening 4 can be significantly larger than the plant's root structure. In this way the root structure can be maneuvered into the planter without having to force it through a small planter opening. The retainer 6 then serves to reduce the effective size of the opening 4 so that the plant and its associated plant growth medium will not drop from the planter when hung.

FIG. 6 exemplifies an alternative embodiment of the invention where the planter's body 1 has a slot 15 open to the outside of the planter. The slot 15 is adjacent to the planter's lower opening 4 and an alternative retainer 6a can be slid into the slot 15 to significantly reduce the effective size of that opening 4. In this embodiment of the invention the root system of the plant is placed into the planter through the planter's lower opening 4 and the retainer 6a is slid into place around the stem of the plant as it proceeds through the slot 15. Alternatively, if desired, the root system can be placed into the planter via the upper opening 5.

In preferred embodiments of the invention the material from which the reservoir 9 is formed is chosen based on the rate that water can move through it. As will be appreciated, if the material chosen allows rapid seepage of water, then the plant can be over-watered or overfed and/or excess fluid may pass completely through the plant growth medium and drip onto the floor or ground below. Preferably the reservoir is sealed with a lid after it has been filled so as to prevent evaporation of its contents. This reduces the likelihood of the reservoir running dry. If the reservoir were to run dry then the ceramic material from which it is formed may undesirably draw water away from the plant/plant growth medium. Preferably the roof of the reservoir has a substantially waterproof glaze or other coating to prevent water being drawn through it to a position where such water can readily evaporate in the outside atmosphere.

Preferably the planter is filled such that the plant growth medium is in constant contact with the floor and side walls of the reservoir. This may aid a more balanced release of water from the reservoir in that the sorptivity of the plant growth medium can dictate the rate at which water is drawn down, rather than the fluctuating requirements of the plant. For example, as the plant growth medium becomes dry it tends to draw fluid down from the reservoir at a greater rate than when the plant growth medium is moist. It will be appreciated that different types of reservoir or reservoir materials may be chosen depending on the type of plant within the planter. For plants which require more water a faster water releasing reservoir may be selected than for plants which have less demand for water. In some embodiments of the invention the plant growth medium may receive fluid from the reservoir by way of osmosis.

The planter body 1 and retainer 6 may be formed entirely or in part from a suitable ceramic material although suitable alternative materials can be used if desired. The invention is thus not dependent on the use of any particular material.

While some preferred embodiments of the invention have been described by way of example it should be appreciated that modifications and improvements can occur without departing from the scope of the following claims.

The invention claimed is:

1. A planter having a body suitable for receiving a volume of plant growth medium and the root structure of a plant, the planter having an opening such that the plant hangs downward from the planter through the opening when the planter is hung in an elevated disposition, a retainer means which removably engages the planter at the opening to reduce the size of the opening to hold the plant in place, and a reservoir for holding a body of fluid, the reservoir being removable from the rest of the planter and being located above the body of the planter which holds the growth medium and roots of the plant and having at least one of a wall and floor of a porous material through which the fluid gradually moves from the reservoir into the planter's body by seeping into, being held in, and passing through at least one of the reservoir wall and floor to at least one of water and nourish a plant when planted within the planter, the planter being formed so that when it is in use it is secured in said elevated disposition by a hanging means on the planter with the root structure of a plant contained within the body and at least one of a stem and foliage of the plant passing through the opening through the retainer means to hang in a downwards disposition from the planter.

2. A planter according to claim 1, wherein the retainer means has a central aperture and a side opening, the side opening proceeding from an edge of the retainer means to merge with the central aperture, the retainer means formed such that it can be moved against the side of the stem of a plant so that the stem passes through the side opening and into the central aperture.

3. A planter according to claim 2, with a plant and plant growth medium within the body, with water contained in the reservoir, and a stem of the plant proceeding downwards through the opening so that the plant is substantially inverted.

4. A planter according to claim 1, wherein the retainer means has a central aperture and a side opening, the side opening proceeding from an edge of the retainer means to merge with the central aperture, the retainer means formed so that it can be moved against the side of the stem of a plant so that the stem passes through the side opening and into the central aperture, and wherein the side opening of the retainer means is narrower than the central aperture of the retainer means.

5. A planter according to claim 1, wherein the retainer means has a central aperture and a side opening, the side opening proceeding from an edge of the retainer means to merge with the central aperture, the retainer means formed so that it can be moved against the side of the stem of a plant so that the stem passes through the side opening and into the central aperture, the side opening of the retainer means being narrower than the central aperture of the retainer means, and wherein the retainer means is generally in the form of an annular disc, except for the side opening.

6. A planter according to claim 1, wherein the retainer means has a central aperture and a side opening, the side opening proceeding from an edge of the retainer means to merge with the central aperture, the retainer means formed so that it can be moved against the side of the stem of a plant so that the stem passes through the side opening and into the central aperture, the side opening of the retainer means being narrower than the central aperture of the retainer means, the retainer means being generally in the form of an annular disc, except for the side opening, and wherein the retainer means is concave.

7. A planter according to claim 1, wherein the retainer means has a central aperture and a side opening, the side opening proceeding from an edge of the retainer means to merge with the central aperture, the retainer means formed so that it can be moved against the side of the stem of a plant so that the stem passes through the side opening and into the central aperture, the side opening of the retainer means being substantially narrower than the central aperture of the retainer means, and wherein the retainer means has a plurality of locking tabs which can be received in complimentary recesses around the planter's opening.

8. A planter according to claim 1, wherein the planter has a slot open to the exterior of the planter and the retainer means slides through the slot to reduce the effective size of the opening.

9. A planter according to claim 1, wherein the retainer means has a central aperture and a side opening, the side opening proceeding from an edge of the retainer means to merge with the central aperture, the retainer means formed so that it can be moved against the side of the stem of a plant so that the stem passes through the side opening and into the central aperture, and the side opening of the retainer means being narrower than the central aperture of the retainer means.

10. A planter according to claim 1, wherein the retainer means has a central aperture and a side opening, the side opening proceeding from an edge of the retainer means to merge with the central aperture, the retainer means formed so that it can be moved against the side of the stem of a plant so that the stem passes through the side opening and into the central aperture, the side opening of the retainer means being narrower than the central aperture of the retainer means, and wherein the wall is formed from a ceramic substance.

11. A planter according to claim 1, wherein the retainer means has a central aperture and a side opening, the side opening proceeding from an edge of the retainer means to merge with the central aperture, the retainer means formed so that it can be moved against the side of the stem of a plant so that the stem passes through the side opening and into the central aperture, the side opening of the retainer means being narrower than the central aperture of the retainer means, at least one of the wall and floor being formed from a ceramic substance, and wherein the planter has an upper opening for receiving the reservoir.

12. A planter according to claim 1, wherein the retainer means has a central aperture and a side opening, the side opening proceeding from an edge of the retainer means to merge with the central aperture, the retainer means formed so that it can be moved against the side of the stem of a plant so that the stem passes through the side opening and into the central aperture, the side opening of the retainer means being narrower than the central aperture of the retainer means, at least one of the wall and floor being formed from a ceramic substance, the planter having an upper opening for receiving the reservoir, and wherein the upper opening can receive a plant and a volume of plant growth medium prior to receiving the reservoir.

13. A planter according to claim 1, wherein the retainer means has a central aperture and a side opening, the side opening proceeding from an edge of the retainer means to merge with the central aperture, the retainer means formed so that it can be moved against the side of the stem of a plant so that the stem passes through the side opening and into the central aperture, and the side opening of the retainer means being narrower than the central aperture of the retainer means.

14. A planter according to claim 1, wherein the retainer means has a central aperture and a side opening, the side opening proceeding from an edge of the retainer means to merge with the central aperture, the retainer means formed so that it can be moved against the side of the stem of a plant so that the stem passes through the side opening and into the central aperture, the side opening of the retainer means being narrower than the central aperture of the retainer means, the planter incorporating a length of cord or chain to facilitate hanging the planter in an elevated disposition.

15. A method of placing a plant in a planter wherein the planter is in accordance with claim 1, the method comprising the steps of: a) arranging a plant so that a root system of the plant is within the body of the planter with the retainer means extending around a stem of the plant; b) locking the retainer means with respect to the body of the planter; and c) causing the planter to be in an elevated situation so that the plant is held by the planter in an inverted disposition.

16. A method according to claim 15 wherein the retainer means is associated with the stem by moving the stem through a side opening in the retainer means so that the stem extends through a central part of the retainer means, the side opening providing a channel which is open to an outer edge of the retainer means.

17. A planter having a body suitable for receiving a volume of plant growth medium and the root structure of a plant, the planter having an opening, such that the plant hangs downward from the planter through the opening when the planter is hung in an elevated disposition, a retainer means which is removably engaged to the planter at the opening to reduce the size of the opening to hold the plant in place, the retainer means serves to engage the opening from underneath the opening and be locked in place, and a reservoir suitable for holding a body of fluid, the reservoir being removable from the rest of the planter and being located above the body of the planter which holds the growth medium and roots of the plant and having at least one of a wall and floor of a porous material so that the fluid can gradually move from the reservoir into the planter's body by seeping into, being held in, and passing through at least one of the reservoir wall and floor to at least one of water and nourish a plant when planted within the planter, the planter being formed so that when it is in use it is secured in said elevated disposition by a hanging means on the planter with the root structure of a plant contained within the body and at least one of a stem and foliage of the plant passing through the opening and through the retainer means to hang in a downwards disposition from the planter.

* * * * *